United States Patent
van Manen et al.

(10) Patent No.: US 9,245,365 B2
(45) Date of Patent: *Jan. 26, 2016

(54) DYNAMIC DIGITAL IMAGE COMPOSITING USING IMAGE TEMPLATES

(71) Applicant: Adobe Systems Incorporated, San Jose, CA (US)

(72) Inventors: Bob van Manen, Happy Valley, OR (US); Daniel J. Clark, Big Sur, CA (US); Brian McPheeters, Lake Forest, CA (US)

(73) Assignee: Adobe Systems Incorporated, San Jose, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 14/074,883

(22) Filed: Nov. 8, 2013

(65) Prior Publication Data

US 2015/0131923 A1 May 14, 2015

(51) Int. Cl.
| | |
|---|---|
| *G06K 9/36* | (2006.01) |
| *G06T 11/60* | (2006.01) |
| *G06T 3/40* | (2006.01) |
| *G06K 9/62* | (2006.01) |
| *G06F 17/30* | (2006.01) |

(52) U.S. Cl.
CPC .......... *G06T 11/60* (2013.01); *G06F 17/30247* (2013.01); *G06K 9/6202* (2013.01); *G06T 3/4092* (2013.01); *G06T 2200/16* (2013.01); *G06T 2200/32* (2013.01)

(58) Field of Classification Search
CPC .......... G06T 3/40; G06T 3/5005; G06T 5/50; G06T 11/20; G06T 11/60; G06T 2207/20016; G06T 2207/20221; G06F 3/14; G06F 17/30038; H04N 1/40068; H04N 1/60; H04N 7/181; H04N 19/107; H04N 19/115; H04N 19/154; H04N 19/162; H04N 19/172; H04N 19/1923; H04N 19/46; H04N 19/577; H04N 19/59; H04N 19/60; H04N 19/61; H04N 19/63; H04N 19/895; G09G 2340/0407; G09G 2340/0464; G09G 2370/027
See application file for complete search history.

(56) References Cited

U.S. PATENT DOCUMENTS

| | | | | |
|---|---|---|---|---|
| 5,325,449 A | * | 6/1994 | Burt et al. | 382/240 |
| 5,488,674 A | * | 1/1996 | Burt et al. | 382/284 |
| 6,681,056 B1 | * | 1/2004 | Tseng et al. | 382/282 |
| 7,983,512 B2 | * | 7/2011 | Gerhard et al. | 382/299 |
| 8,019,182 B1 | | 9/2011 | Wolfram et al. | |
| 8,619,083 B2 | * | 12/2013 | Nickolov et al. | 345/428 |
| 8,732,266 B2 | * | 5/2014 | Maigatter | 709/217 |
| 8,914,744 B2 | * | 12/2014 | Spencer et al. | 715/800 |

* cited by examiner

*Primary Examiner* — Jose Couso
(74) *Attorney, Agent, or Firm* — Finch & Maloney PLLC (57) ABSTRACT

Techniques are disclosed for dynamic digital image compositing using a digital image template. A request is received to generate a composite digital image at a user-specified resolution based on a master digital image. Each of a plurality of digital image templates includes image data representing a different, particular resolution of the master digital image. The digital image templates can be stored in a common file with the master digital image. One of the digital image templates associated with a resolution that is at least as high as and closest to the user-specified resolution is selected for compositing. Composite image data is then generated based on the selected digital image template. Next, the composite image is rendered based on the composite image data and scaled to the user-specified resolution.

20 Claims, 6 Drawing Sheets

DYNAMIC DIGITAL IMAGE COMPOSITING USING IMAGE TEMPLATES

FIELD OF THE DISCLOSURE

This disclosure relates generally to the field of data processing, and more particularly, to techniques for generating a composite digital image at a user-specified resolution based on a master digital image.

BACKGROUND

Digital image compositing includes the process of digitally manipulating images from separate sources to create a single image that incorporates elements from each source.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

As mentioned above, a composite digital image incorporates elements from different sources, such as a combination of two or more separate images. Generating such composite images can be resource and/or time intensive, particularly when the composites have different resolutions than the sources on which they are based. A prior solution includes pre-rendering the composites offline at all of the possible resolutions. However, this solution is not practical when the composites are intended to be modified dynamically. Moreover, the number of possible composites may be too large to be rendered offline.

To this end, techniques are disclosed herein for dynamic digital image compositing using digital image templates. In an example embodiment of the present invention, each digital image template represents a different, particular resolution of a master digital image. The digital image templates can be stored in a common file with the master digital image. In response to receiving a request to generate a composite digital image at a user-specified resolution based on the master digital image, one of the digital image templates associated with a resolution that is at least as high as and closest to the user-specified resolution is selected for compositing. Composite image data is then generated based on the selected digital image template. Next, the composite image is rendered based on the composite image data and scaled to the user-specified resolution. In another embodiment, the composite image is rendered based on the composite image data and image data representing a user-supplied digital image, and scaled to the user-specified resolution. Numerous configurations and variations will be apparent in light of this disclosure.

As will be appreciated in light of this disclosure, to achieve high quality image compositing, the master image can be provided as a high-resolution file, such as a Photoshop® file or other high resolution image file. The master image can then be modified to incorporate one or more elements of a user-supplied image, which results in a composite image. The resulting composite image can then be scaled to a specified resolution and delivered using a URL or other suitable referent. Such image composites can be dynamically generated on-demand tier a variety of devices and screens. Some of the devices can support rich web client viewers, which show the composite at an initial small size and then allow the user to zoom in to the composition. Users can build rich web client configurators, which allow end-users to customize the composite dynamically. One example is for an end-user to provide their initials, which will appear in the composite as a monogram. Another example is to dynamically show, hide or modify the image layers in the composite.

As used herein, the term "dynamic," in addition to its plain and ordinary meaning, includes performing an action, such as generating a composite digital image, in response to a user input (e.g., performing an action on-demand). For instance, a composite digital image can be generated from a master image or variant thereof in response to receiving a user-specified resolution for the composite image.

As mentioned above, the digital image templates represent the master digital image at different, particular resolutions. When a master, full resolution image (e.g., a Photoshop® file) is uploaded to a server, the image can be processed to generate the image templates. The process, which may be performed offline (e.g., prior to receiving a user input) or online (e.g., in response to receiving a user input), can generate the image templates by repeatedly downscaling the master image by a power of two until the lowest resolution image template fits into a 128×128 pixel rectangle, in accordance with one example embodiment. For instance, if the master image has a resolution of 1000×1000 pixels, the resulting image template file may contain the 1000×1000 master image and 500×500, 250×250, and 125×125 pixel image templates. All of the image templates can then be stored into the same file as the master image. In some embodiments, the file can be in a proprietary format, while each image template stored in the file can be in a Photoshop® format. Note that this solution is not limited to power of two scale levels; custom resolutions are possible, as will be appreciated in light of this disclosure. This permits a user that has many requests at a certain image resolution that is not represented by one of the image templates to pre-scale the master image to a custom image resolution and add it to the file. Once the template generation process has completed, the file containing the master image and the image templates can then be uploaded to a server and/or an image repository.

In one example embodiment, a composite image can be generated by combining one of the image templates with a user-supplied digital image and scaling the composite to the user-specified resolution. In another example embodiment, one of the image templates can be scaled to the user-specified resolution. The scaled image template may then be modified by a user in any number of ways, including, for example, compositing with a user-supplied digital image. In yet another example embodiment, the composite image can be generated by combining one or more user-supplied digital images with one or more image templates. Another process receives requests to modify the file, build a dynamic image composite and deliver the resulting image at a user-specified image resolution. In one such embodiment, the process selects an image template out of the file based on the user-specified image resolution and builds the dynamic composite using the selected image template. The process selects the image template by finding the image template that has the same resolution as the user-specified image resolution. If none of the image templates have the user-specified image resolution, the process picks the image template having the next highest resolution. For instance, in the previous example, if the request is for a 300×300 image resolution, the server selects the image template at the 500×500 resolution. Once the composite is done, the resulting image can then be rendered and scaled to the user-specified image resolution.

System Architecture

Figure 1:
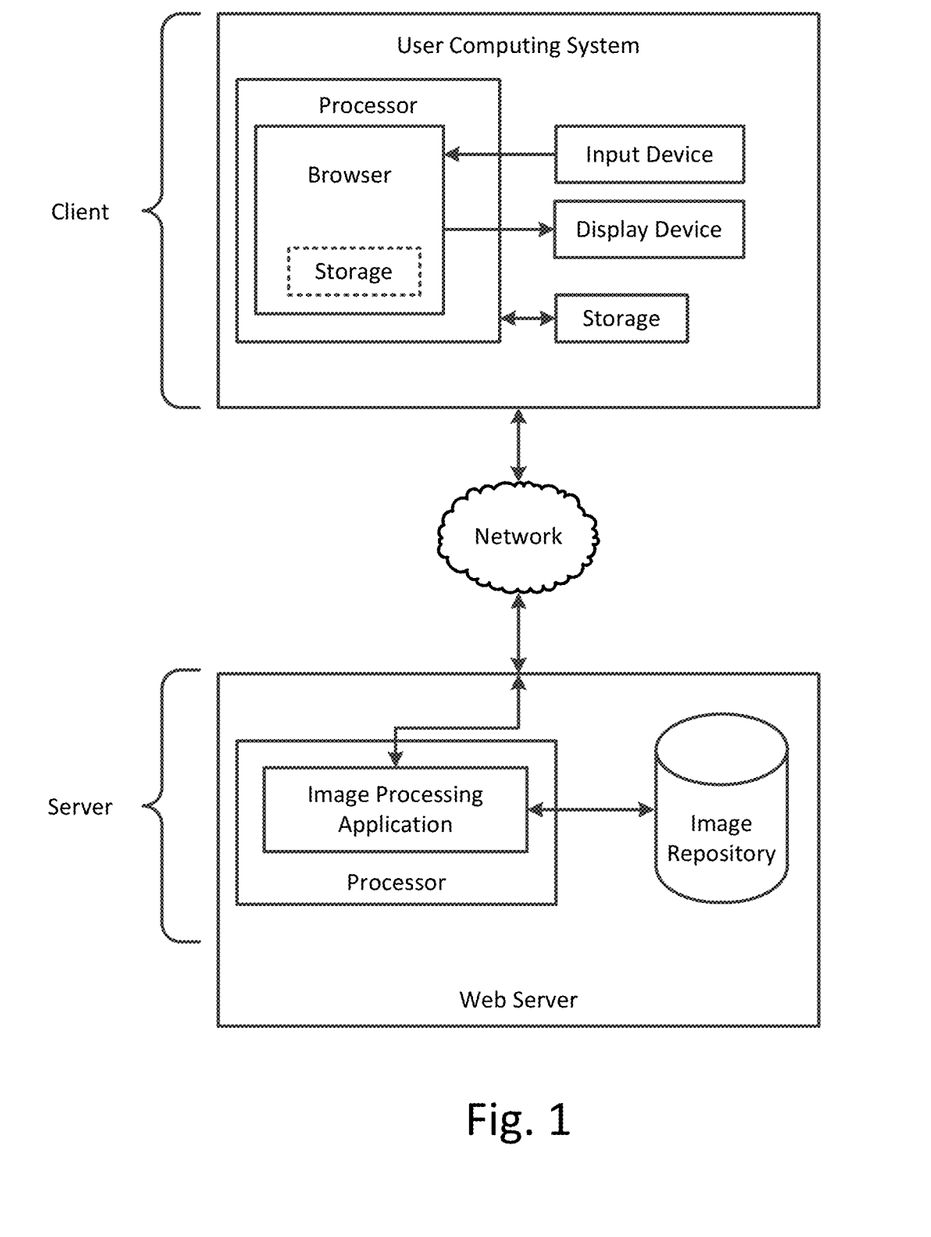
FIG. 1 illustrates an example user computing system configured in accordance with an embodiment of the present invention.

FIG. 1 illustrates an example system for dynamic digital image compositing using a digital image template. The system includes a user computing system and a web server communicatively coupled to the user computing system via a network. The web server includes a local processor and hosts an image repository for storing various image resources, such as Photoshop® files, image templates and/or other digital image files. The user computing system includes a browser that is executable by a local processor and can be used to access and interact with an image processing application executable or otherwise accessible by the server, and for accessing and changing image resources in the image repository. The browser interacts with one or more input devices, such as a keyboard and mouse, and one or more display devices. The image processing application may include, for example, a graphics editing program, such as a version of Adobe Photoshop® or other application that allows image compositing. In some cases, the application forms part of software as a service (SaaS). As used herein, the term "software as a service," in addition to its plain and ordinary meaning, includes a service delivery model in which a client-accessible application and associated data are centrally hosted on a network-based server. In some other cases, the application and/or image repository can reside locally on the user computing system or on another network-connected device. Numerous other variations will be apparent in light of this disclosure, such as an embodiment in which the image processing application and image repository are at least partially located on the server and the application is configured to serve code to the user computing system (e.g., JavaScript modules). The code can then be received and executed by the user computing system so as to carry out at least some functional aspects of the image processing application (e.g., image compositing). Thus, functionality of the methodology provided herein may be executed on the user computing system, the web server, or any combination thereof. The system may include additional components and still fall within the scope of the disclosed embodiments. The browser can be any of a number of browsers, including, for example, Microsoft Internet Explorer®, Mozilla Firefox®, Safari®, Google Chrome®, and Opera®. The browser can include a storage for at least temporarily storing data used to perform at least some functional aspects of the methodology provided herein. The user computing system can be configured to execute any of a number of operating systems, such as Microsoft Windows®, Mac OS®, Google Android® and any one of the Linux®-based operating systems. The user computing system can be implemented with any suitable computing device, such as a laptop, desktop, tablet computer, smartphone, or other suitable computing device capable of receiving input from a user and providing a GUI via the display. The image repository and storage can be implemented, for example, with any suitable type of memory, such as a disk drive included in, or otherwise in communication with, the browser and/or the web application. Other suitable memories include flash memory, random access memory (RAM), a memory stick or thumb drive, USB drive, cloud storage service, etc. In a more general sense, any memory facility can be used to implement the image repository and storage. The network can be any communications network, such as a local area network or the Internet, or any other public and/or private communication network. Such a system may be suitable, for example, for providing dynamic digital image compositing using techniques as variously described herein.

It will be appreciated that, in some embodiments, various functions performed by the browser, the application, and the image repository, as described herein, can performed by similar processors and/or storage devices in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. Various components of the system shown in FIG. 1, such as the browser and application, can be implemented in software, such as a set of instructions (e.g. C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Image Templates

Figure 2:
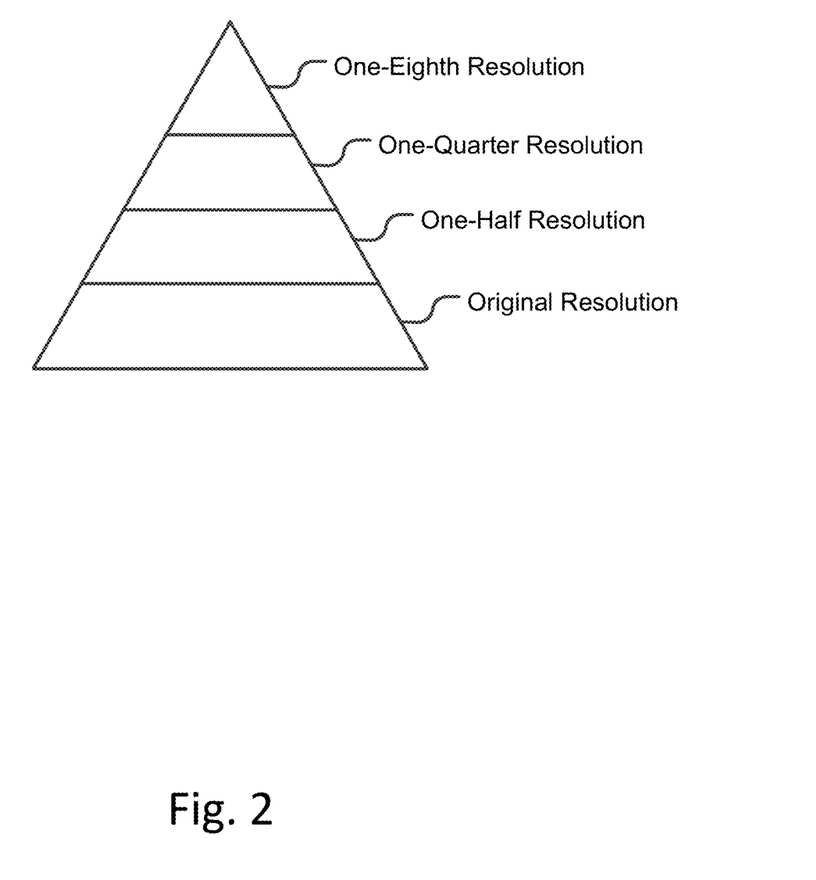
FIG. 2 illustrates a conceptual example of an image template file in accordance with an embodiment of the present invention.

FIG. 2 illustrates a conceptual example of an image template file in accordance with an embodiment. When working with a graphics editor, a master, full resolution digital image can be imported into an image repository, such as the image repository of FIG. 1, for subsequent access by the application. The master image forms a basis from which variations (e.g., downscaled versions) of the master digital image and/or a composite image can be generated. For example, the master image may serve as a background upon which another, user-supplied digital image may be superimposed, resulting in a composite image. A web site may display a low-resolution preview of the composite image. However, if the image repository contains only the full resolution version of the master image, then the full resolution version must be downscaled each time a low-resolution preview of the composite image is needed.

To reduce processor and memory resources associated with such scaling operations, multiple variations of the master image at different, particular scale levels can be generated and stored in the image template file for subsequent use. In an embodiment, this process, which may be performed offline or online, scales the master image by a power of two to generate a half resolution variation of the master image. Other variations of the master image can be generated instead of or in addition to the half resolution variation, such as a quarter resolution, eighth resolution, and so forth. Conceptually, the multiple variations of the master image can be represented as a pyramid formed by successively smaller image templates, such as depicted in FIG. 2, since each variation has a resolution that is proportional to the full resolution version in two dimensions (e.g., height and width). Each of the variations can be stored in a common file.

In one embodiment, the full resolution version of the master image can be repeatedly downscaled until the image fits in to a 128×128 pixel rectangle. Each downscaled variation can be stored in the common file. For instance, if the high-resolution master image has a resolution of 1000×1000, the file will contain the 1000×1000, 500×500, 250×250, and 125×125 pyramid levels after downscaling each variation by one-half. Note that this solution is not limited to power of two scale levels; custom image resolutions are possible. Once the process has completed, the file containing the master, full resolution image and each of the downscaled image templates can then be stored in the image repository.

Figure 3:
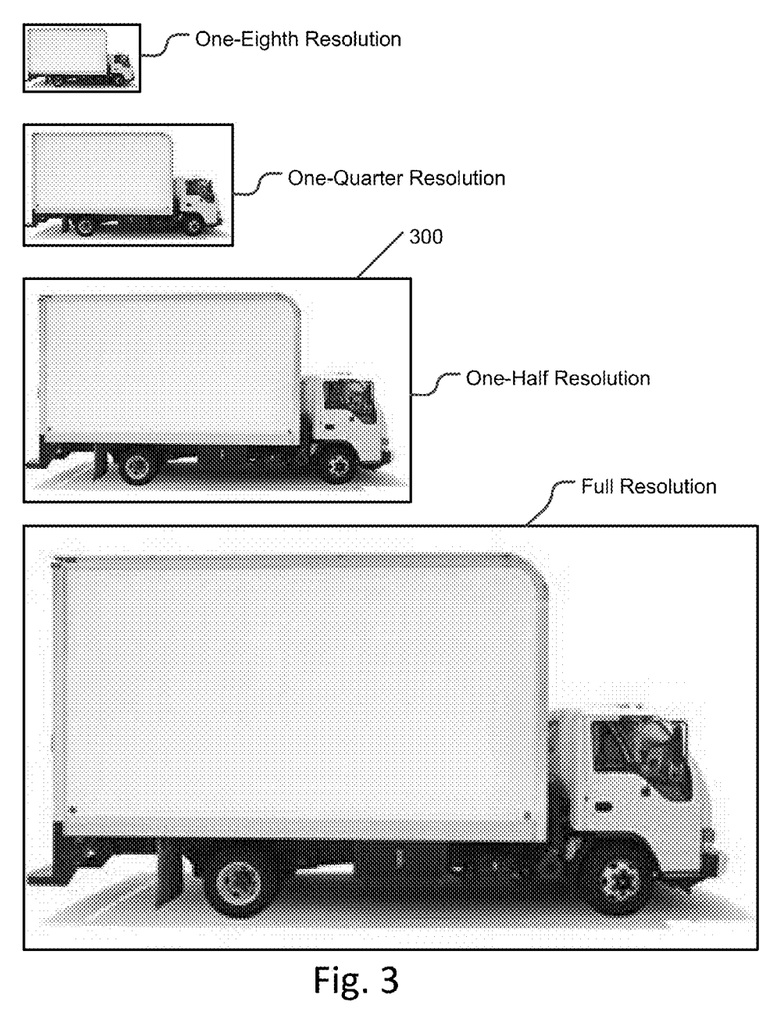
FIG. 3 illustrates example digital image templates in accordance with an embodiment of the present invention.

FIG. 3 illustrates example digital image templates in accordance with an embodiment. As can be seen, each template represents a different, particular resolution of a full resolution, master digital image. For instance, the image template that represents the master image at one-half of the original resolution is indicated at 300. Each template can be stored in an image repository, such as the image repository of FIG. 1. Note that FIG. 3 is not intended to be drawn to scale, but is presented for illustrative purposes. In some cases, the master image and the digital image templates can be stored in a common file. Each of the digital image templates can have a format that is native to or otherwise compatible with a graphics editing application, such as Adobe Photoshop®.

Example Sequence for Generation a Composite Digital Image

Figure 4:
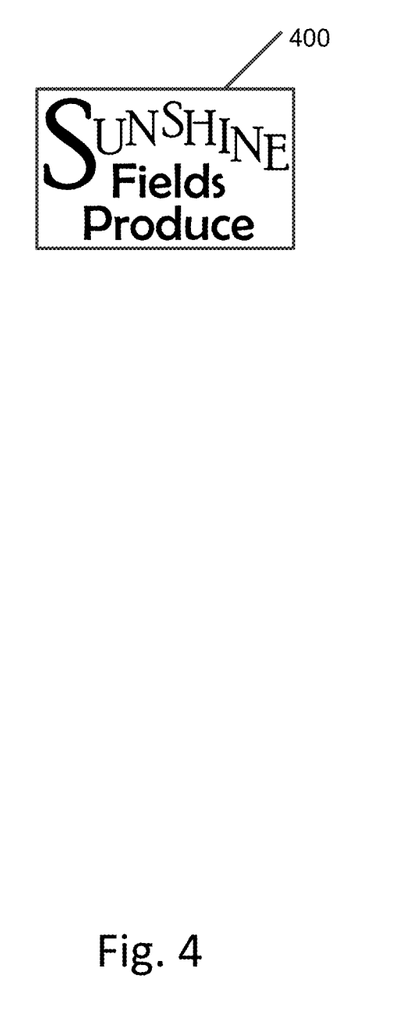
FIG. 4 illustrates an example user-supplied digital image.
Figure 5:
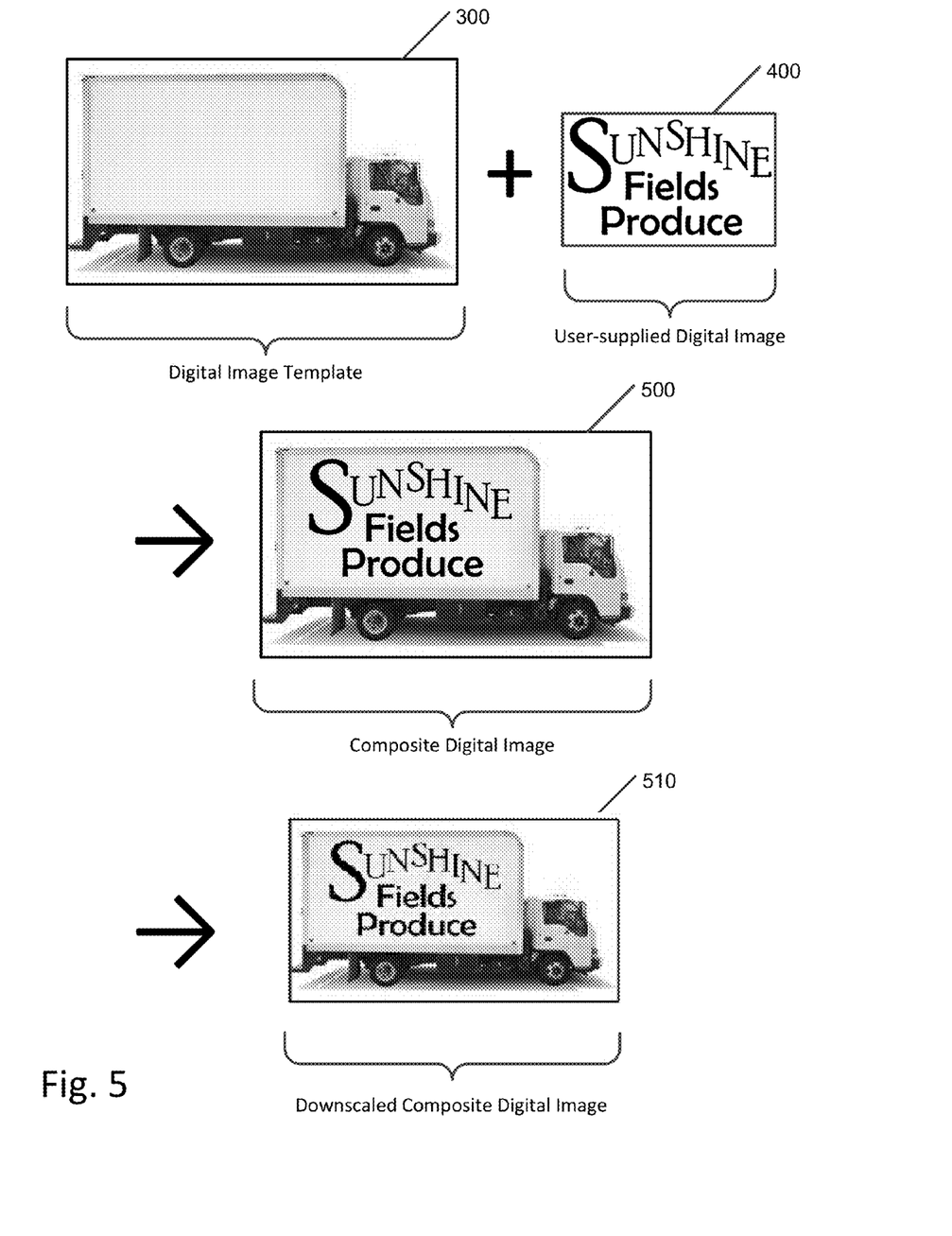
FIG. 5 illustrates an example sequence for generating a composite digital image using the example user-supplied digital image of FIG. 4 and one of the digital image templates of FIG. 3 in accordance with an embodiment of the present invention.

FIG. 4 illustrates an example user-supplied digital image 400. FIG. 5 illustrates an example sequence for generating a composite digital image 500 using the example user-supplied digital image 400 of FIG. 4 and one of the digital image templates 300 of FIG. 3 in accordance with an embodiment. For purposes of this example the user specifies that the composite image to be rendered at a resolution of 630 by 570 pixels; the master resolution of the master digital image is 1680 by 1520 pixels, the one-half resolution image template is 840 by 760 pixels, and the one-quarter resolution image template is 420 by 380. Since there is no image template that has the same resolution as the user-specified resolution, the next highest resolution template (e.g., the one-half resolution image template) is selected as the image template for compositing with the user-supplied digital image. The result of combining the image template 300 with the user-supplied digital image 400 is a composite digital image 500 at the one-half resolution (e.g., 840 by 760 pixels). The composite image 500 is then scaled to the user-specified resolution (e.g., 630 by 570 pixels) to produce a scaled composite digital image 510.

Example Methodology for Generating Image Templates

Figure 6:
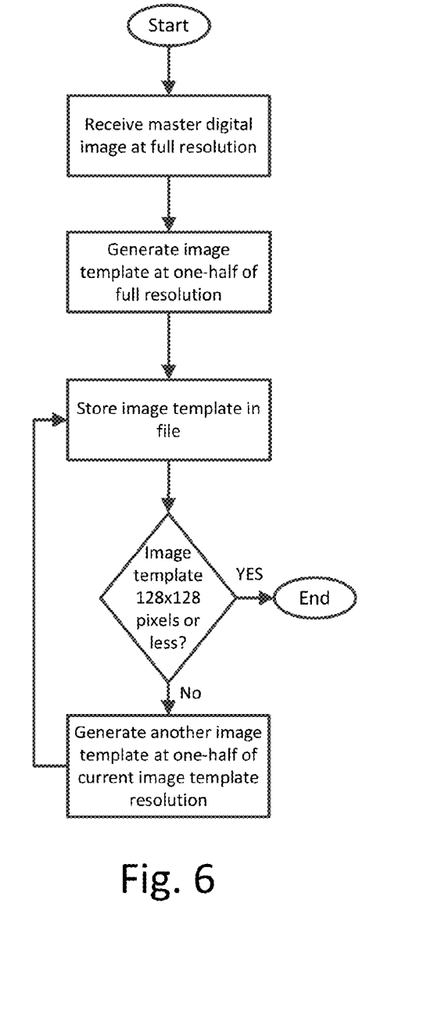
FIG. 6 illustrates an example methodology for generating a plurality of image templates from a master digital image in accordance with an embodiment of the present invention.

FIG. 6 illustrates an example methodology for generating a plurality of image templates from a master digital image at full resolution in accordance with an embodiment. The method begins by receiving a master digital image at full resolution. For example, the master image may be uploaded to a server, such as the web server of FIG. 1, by a user. The method continues by generating an image template at one-half of the full resolution of the master image. It will be understood that image templates can be generated at other resolutions, such as one-third, two-thirds, three-quarters, or any other resolution, and that one-half resolution is merely one example. The generated image template is stored in a file. If the one-half resolution is 128×128 pixels or less, the method ends. Otherwise, another image template at one-half of the one-half resolution (e.g., one-quarter) image template is generated. Additional image templates are generated until the lowest resolution image template is 128×128 pixels or less. In some embodiments, resolutions other than 128×128 pixels may be used as the termination condition of the method.

Example Methodology for Dynamic Digital Image Compositing

Figure 7:
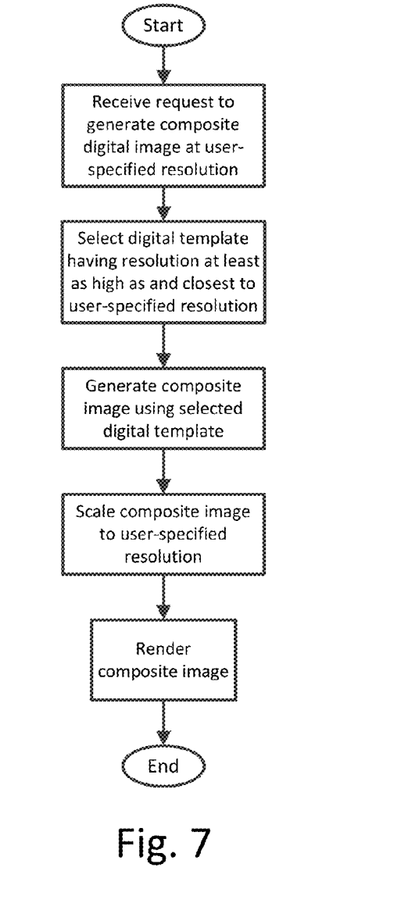
FIG. 7 illustrates an example methodology for dynamic digital image compositing using a digital image template in accordance with an embodiment of the present invention.

FIG. 7 illustrates an example methodology for dynamic digital image compositing using a digital image template in accordance with an embodiment. The method begins by receiving a request to generate a composite digital image at a user-specified resolution. The composite image includes a variation of a master image (e.g., a downscaled version of the master image) in combination with a user-supplied digital image. The method continues by selecting one of a plurality of image templates based on the user-specified resolution. The selected image template is a version of the master image having a resolution that is as high as and closest to the user-specified resolution among all of the image templates. In one specific embodiment, the server can select the image template by finding the image template that has the same resolution as the desired image resolution. If there is no image template at the desired image resolution, the image template with the next highest resolution can be selected. For example, if 1000×1000, 500×500, 250×250, and 125×125 pixel image templates are stored in a file and the user-specified image resolution is 300×300 pixels, the image template at the 500×500 pixel resolution may be selected, since there is no image template at the user-specified image resolution and 500×500 is the next highest resolution. The method continues by generating a composite image using the selected image template and the user-supplied image. Once the composite is done, the resulting composite image is scaled to the user-specified image resolution. The scaled composite image may, for example, be sent to a browser on a user computing device, such as the described with respect to FIG. 1, to be rendered on a display device.

Numerous embodiments will be apparent in light of the present disclosure, and features described herein can be combined in any number of configurations. One example embodiment provides a computer-implemented method. The method includes receiving an input that requests generation of a composite digital image at a user-specified resolution based on a master digital image, selecting one of a plurality of digital image templates each comprising image data representing a different resolution of the master digital image, the selected digital image template associated with a resolution that is at least as high as and closest to the user-specified resolution, and generating composite image data based on the selected digital image template. In some cases, the method includes rendering the composite digital image based on the composite image data. In some cases, the method includes rendering the composite digital image based on the composite image data and image data representing a user-supplied digital image. In some such cases, the method includes scaling the rendered composite image to the user-specified resolution. In some such cases, the rendering is performed on a server, and the method further includes sending the rendered composite digital image to a client communicatively coupled to the server. In some cases, the user-specified resolution is different than any of the particular resolutions of the digital image templates. In some cases, the method includes processing image data representing the master digital image to obtain the plurality of digital image templates. In some such cases, the method includes storing each of the digital image templates in a common data file. Each digital image template can have a format compatible with an application for creating and manipulating graphic images on a computer. In some such further cases, the format includes an Adobe Photoshop®-compatible format. In some such further cases, the method includes retrieving the selected digital image template from the common data file prior to generating the composite image data. In some cases, some or all of the functions variously described in this paragraph can be performed in any order and at any time by one or more different user computing systems.

Another example embodiment provides a computer-implemented method. The method includes processing image data representing a master digital image to obtain a plurality of digital image templates each comprising image data representing a different resolution of the master digital image, receiving an input that requests generation of a composite digital image at a user-specified resolution based on the master digital image, selecting one of the digital image templates associated with a resolution that is at least as high as and closest to the user-specified resolution, and rendering the composite digital image at the user-specified resolution based on the selected digital image template. In some cases, the method includes scaling the rendered composite image to the user-specified resolution. In some cases, the rendering is performed on a server, and the method includes sending the rendered composite digital image to a client communicatively coupled to the server. In some cases, the user-specified resolution is different than any of the particular resolutions of the digital image templates. In some cases, the method includes storing each of the digital image templates in a common data file. Each digital image template can have a format compatible with an application for creating and manipulating graphic images on a computer. In some such cases, the format includes an Adobe Photoshop®-compatible format. In some cases, some or all of the functions variously described in this paragraph can be performed in an order and at any time by one or more different user computing systems.

Another example embodiment provides a system having a storage and a processor operatively coupled to the storage. The processor is configured to execute instructions stored in the storage that when executed cause the processor to can out a process. The process includes receiving an input that requests generation of a composite digital image at a user-specified resolution based on a master digital image, selecting one of a plurality of digital image templates each comprising image data representing a different resolution of the master digital image, the selected digital image template associated with a resolution that is at least as high as and closest to the user-specified resolution, and generating composite image data based on the selected digital image template. In some cases, the process includes rendering the composite digital image based on the composite image data and image data representing a user-supplied digital image. In some such cases, the process includes scaling the rendered composite image to the user-specified resolution. Another example embodiment provides a non-transient computer-readable medium or computer program product having instructions encoded thereon that when executed by one or more processors cause the processor(s) to perform one or more of the functions variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving an input that requests generation of a composite digital image at a user-specified resolution based on a master digital image;
   selecting one of a plurality of digital image templates each comprising image data representing different intermediate resolutions of the master digital image, the selected digital image template associated with one of the intermediate resolutions that is closest to the user-specified resolution among all of the different intermediate resolutions represented by the digital image templates higher than the user-specified resolution; and
   generating composite image data at the intermediate resolution corresponding to the selected digital image template and based on the selected digital image template prior to displaying the composite digital image at the user-specified resolution,
   wherein the user-specified resolution is different than any of the intermediate resolutions.

2. The method of claim 1, further comprising rendering the composite digital image at the intermediate resolution corresponding to the selected digital image template.

3. The method of claim 2, further comprising scaling the rendered composite image to the user-specified resolution.

4. The method of claim 3, wherein the rendering is performed on a server, and wherein the method further comprises sending the rendered composite digital image to a client communicatively coupled to the server.

5. The method of claim 1, wherein the user-specified resolution is different than any of the particular resolutions of the digital image templates.

6. The method of claim 1, further comprising processing image data representing the master digital image to obtain the plurality of digital image templates.

7. The method of claim 6, further comprising storing each of the digital image templates in a common data file, wherein each of the digital image templates has a format compatible with an application for creating and manipulating graphic images on a computer.

8. The method of claim 7, wherein the format includes an Adobe Photoshop®-compatible format.

9. The method of claim 7, further comprising retrieving the selected digital image template from the common data file prior to generating the composite image data.

10. A computer-implemented method comprising:
    processing image data representing a master digital image to obtain a plurality of digital image templates each comprising image data representing different intermediate resolutions of the master digital image;
    receiving an input that requests generation of a composite digital image at a user-specified resolution based on the master digital image;
    selecting one of the digital image templates associated with one of the intermediate resolutions that is closest to the user-specified resolution among all of the different intermediate resolutions represented by the digital image templates higher than the user-specified resolution; and rendering the composite digital image at the intermediate resolution corresponding to the selected digital image templates, wherein the user-specified resolution is different than any of the intermediate resolutions.

11. The method of claim 10, further comprising scaling the rendered composite image to the user-specified resolution.

12. The method of claim 10, wherein the rendering is performed on a server, and wherein the method further comprises sending the rendered composite digital image to a client communicatively coupled to the server.

13. The method of claim 10, wherein the user-specified resolution is different than any of the particular resolutions of the digital image templates.

14. The method of claim 10, further comprising storing each of the digital image templates in a common data file, wherein each of the digital image templates has a format compatible with an application for creating and manipulating graphic images on a computer.

15. The method of claim 14, wherein the format includes an Adobe Photoshop®-compatible format.

16. A system comprising:
a storage; and
a processor operatively coupled to the storage and configured to execute instructions stored in the storage that when executed cause the processor to carry out a process comprising:
receiving an input that requests generation of a composite digital image at a user-specified resolution based on a master digital image;
selecting one of a plurality of digital image templates each comprising image data representing different intermediate resolutions of the master digital image, the selected digital image template associated with a one of the intermediate resolutions that is closest to the user-specified resolution among all of the different intermediate resolutions represented by the digital image templates higher than the user-specified resolution; and
generating composite image data at the intermediate resolution corresponding to the selected digital image template and based on the selected digital image template prior to displaying the composite digital image at the user-specified resolution, wherein the user-specified resolution is different than the intermediate resolution,
wherein the user-specified resolution is different than any of the intermediate resolutions.

17. The system of claim 16, wherein the process further comprises rendering the composite digital image at the intermediate resolution corresponding to the selected digital image template.

18. The system of claim 17, wherein the process further comprises scaling the rendered composite image to the user-specified resolution.

19. The system of claim 16, wherein the user-specified resolution is different than any of the particular resolutions of the digital image templates.

20. The system of claim 16, wherein the process further comprises processing image data representing the master digital image to obtain the plurality of digital image templates.

* * * * *